KEYBOARD DEVICE FOR TYPESETTING

Filed July 8, 1965 4 Sheets-Sheet 1

INVENTOR.
NEIL SCHLEIFMAN
BY
Marechal, Biebel, French & Bugg
ATTORNEYS

June 18, 1968 N. SCHLEIFMAN 3,388,857

KEYBOARD DEVICE FOR TYPESETTING

Filed July 8, 1965 4 Sheets-Sheet 2

KEYBOARD DEVICE FOR TYPESETTING

Filed July 8, 1965 4 Sheets-Sheet 3

United States Patent Office 3,388,857

Patented June 18, 1968

3,388,857

KEYBOARD DEVICE FOR TYPESETTING

Neil Schleifman, Kew Gardens, Queens, N.Y., assignor to Harris-Intertype Corporation, Cleveland, Ohio, a corporation of Delaware Filed July 8, 1965, Ser. No. 470,537
11 Claims. (Cl. 234—23)

ABSTRACT OF THE DISCLOSURE

An apparatus converts the seven digit codes produced by a ninety key keyboard, such as used by typesetting machines, into a standard six digit code for recordation on perforated tape. When the keyboard operator changes the case of the character, such as from an upper case to a lower case character, a shifting code is automatically placed on the tape prior to the character code being recorded. A storage register retains the character code during the time that the shifting code is being recorded. A single switch may be associated with each key on the keyboard and interconnected with the storage register by a diode matrix.

This invention relates to a keyboard device and associated controls for converting the information produced by the operation of a typesetting machine keyboard to the standard six digit or bit code which is recorded, as on a tape, and later used to control automatically the operation of typesetting machines.

In the production of perforated tape or other records which are used for automatically operating typesetting machines, a savings of time can be realized if the number of motions the tape perforator operator makes in preparing the tape can be reduced. The Teletypesetter (TTS) keyboard normally used to perforate the six digit or bit tape which controls the typesetting machine has many keys which represent more than one character. Therefore, to select the desired character to be perforated on the TTS tape, it is often necessary to first operate a function key immediately prior to operating the desired character. By eliminating the necessity of operating the function keys, the number of key strokes required to set an average amount of tape can be considerably reduced.

With the standard TTS perforator machine, if a capital letter were to be printed, it would first be necessary to operate the function key which represents the shift code before operating the character key. Therefore, two motions by the operator are required to record one character on the tape.

By using a typesetting machine keyboard which does not contain keys representing the shift function codes but rather has a set of keys each of which represent a single character, the time spent in preparing the tape can be reduced.

It is also advantageous to use a typesetting machine keyboard for creating a control record to automatically operate typesetting machines since many people are already trained in the operation and use of these keyboards. Rather than re-train such people to utilize a TTS type keyboard, greater economy can be achieved merely by using a keyboard layout which is familiar to such trained personnel.

A typesetting machine keyboard normally contains ninety keys arranged in six rows of fifteen keys each. The keyboard is generally arranged with the lower case characters positioned to the left, the punctuation marks, figures and special characters arranged in the center, and the upper case characters placed to the right of the keyboard.

Since each key on the typesetting machine keyboard represents but a single character, a seven digit or bit code can be used to designate the particular character selected. The first six digits of this code are identical to the code produced by the character keys on the TTS perforator machine keyboard, and the seventh digit indicates whether the character selected is a shift or unshift character.

Accordingly, it is the primary object of this invention to provide a novel device for converting the typesetting information which is presented in a seven digit code by a typesetting machine keyboard to the standard six digit code which can be recorded on a perforated tape used to control a typesetting machine.

It is another object of this invention to provide a novel device for automatically placing on a six digit perforated tape a shifting code to signify a shift or unshift condition each time the keyboard operator changes from a shift to an unshift character and each time he changes from an unshift to a shift character.

It is another object of this invention to provide a device to produce a perforated tape containing six digit information directly from the keyboard layout as a typesetting machine.

It is an object of this invention to provide a device for creating a typesetting machine control record which can be used to control the operation of a typesetting machine, or which can be fed to a computer for justification, and hyphenation, or which can be transmitted over existing transmission lines, but using a typesetting machine keyboard which is familiar to operators trained in the use of linecasting machine type keyboards.

These and other objects and advantages of the invention will be apparent from the following description, the accompaning drawings and the appended claims.

Figure 1:
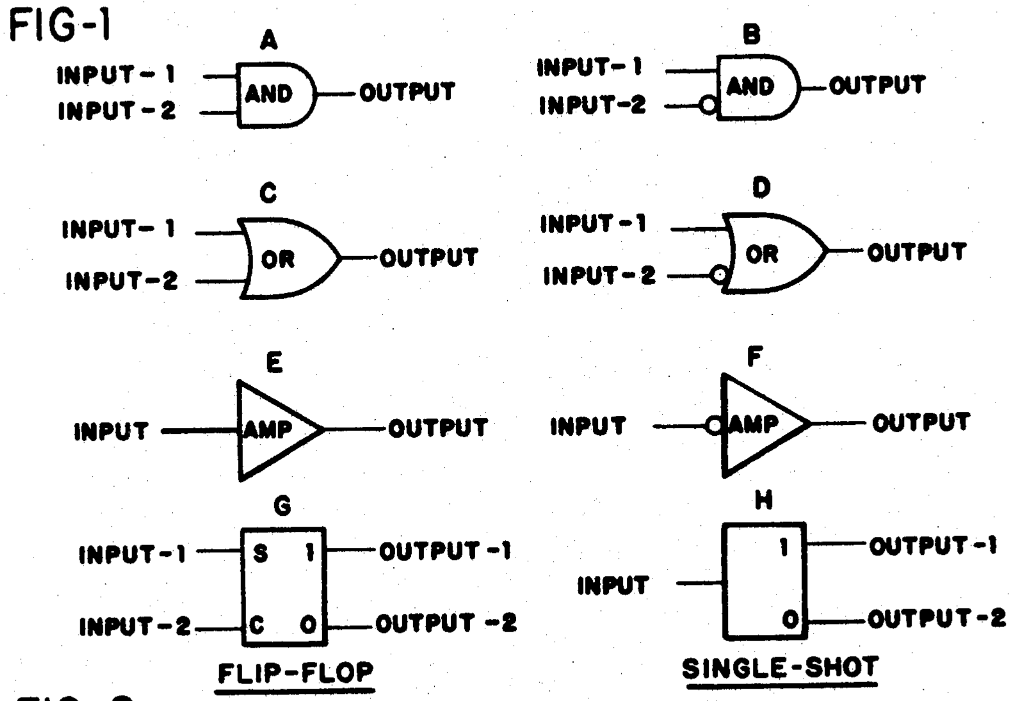
FIGS. 1A through 1H are various graphical symbols for the logic circuits used to describe the converter device of this invention.

Referring now to the drawings, which represent a preferred embodiment of the invention, FIGS. 1A through 1H represent various graphical symbols which are commonly used to represent logic circuits. The symbols used in FIGS. 1A through 1H are conventional and can be found in American Standard Graphic Symbols for Logic Diagrams published by American Institute of Electrical Engineers, 1962.

The graphic symbol for an AND gate is shown in FIG. 1A. The inputs and output of an AND circuit, as well as the other circuits graphically illustrated herein are binary and assume either one of two possible definite conditions which are designated as the One-state and the Zero-state condition. The output of this type of an AND assumes the One-state if and only if both input 1 and input 2 assume the One-state.

The graphic symbol for an OR circuit is shown in FIG. 1C. The output of this particular type of OR assumes the One-state if one or more of the inputs assumes the One-state. The symbol for an AMPLIFIER is shown in FIG. 1E. The output of an AMPLIFIER assumes the One-state if and only if the input assumes the One-state.

Variations of the AND, OR and AMPLIFIER can be made by placing a LOGIC NEGATION either at the input or the output of particular logic symbol. The symbol for a LOGIC NEGATION is a small circle drawn at the point where a signal line joins a logic symbol. The output of a LOGIC NEGATION operation takes on the One-state if and only if the input does not take on the One-state.

FIG. 1B is an example of an AND logic symbol having a LOGIC NEGATION at input 2. With this symbol, therefore, for the output of the AND to assume the One-state, it is necessary to have a One-state signal on input 1 and a Zero-state signal on input 2. Any other input signals will give a Zero-state output from the AND circuit.

The same principle applies when a LOGIC NEGATION is associated with an OR. In FIG. 1D, the OR will have a One-state output whenever there is a One-state signal on input 1 or a Zero-state signal on input 2.

An AND gate can be prevented from operating by placing what is called an "inhibit signal" at one of the inputs. Referring to FIG. 1A, an inhibit signal would consist of placing a Zero-signal on either input 1 or input 2. Placing a One-state signal on input 2 in FIG. 1B would inhibit the operation of the AND gate.

FIG. 1G shows the graphic symbol for a FLIP-FLOP. A FLIP-FLOP is a logic device that stores a single bit of information. The FLIP-FLOP shown in FIG. 1G has two inputs, a set (S) at input 1 and clear or reset (C) at input 2, and two outputs, One at output 1 and Zero at output 2. A One-state is stored in a FLIP-FLOP when a One-state signal is first applied to the set input 1. Output 1 then assumes a One-state and the output 2 assumes the Zero-state. A Zero-state is stored in the FLIP-FLOP when a One-state signal is first applied to the clear input 2. The outputs then are in opposite states from what they were when the FLIP-FLOP stored a One-state.

FIG. 1H represents a SINGLE-SHOT which is activated by a significant transition of the input signal. The shape, duration and polarity of the output are determined by the circuit characteristics of the SINGLE-SHOT, not by the input signal. The inactive state of the SINGLE-SHOT is the Zero-state. A One-state signal is available from output 1 and a Zero-state signal is available from output 2 when the SINGLE-SHOT is in the Zero-state. When activated, the SINGLE-SHOT changes to the One-state, reversing the signals on outputs 1 and 2 for the characteristic period of time determined by the circuit, then returns to the Zero-state.

Figure 2:
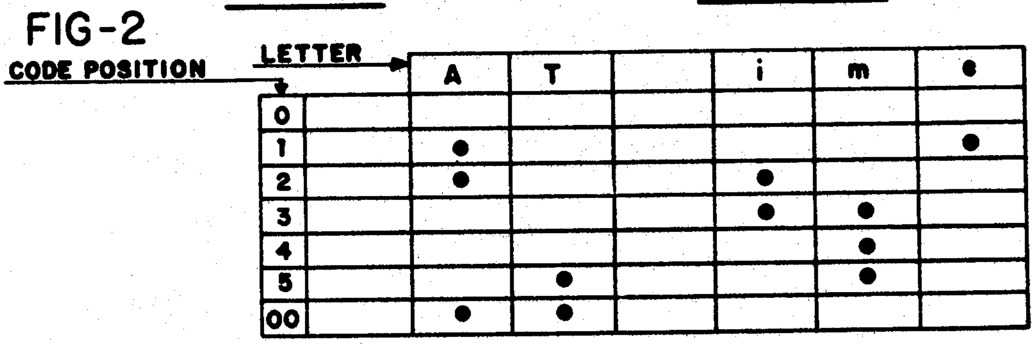
FIG. 2 represents the coded output from a typesetting machine keyboard showing the seven digit code combination for the letters A, T, i, m and e.
Figure 6:
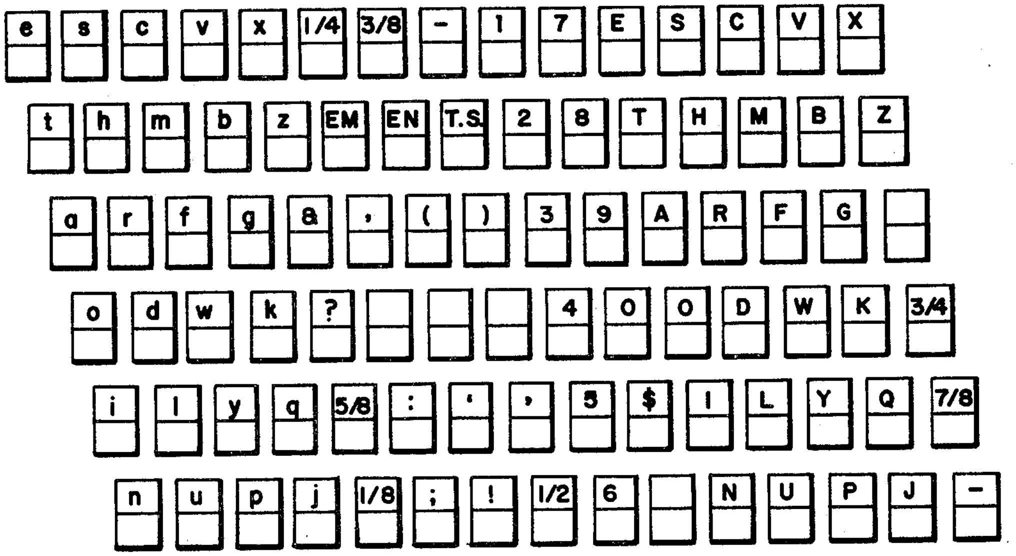
FIG. 6 shows a typical layout for a ninety key keyboard.

Reference is now made to FIG. 2, where the coded outputs from a typesetting keyboard for the letters A, T, i, m, e are graphically illustrated. When a key on the typesetting keyboard unit is depressed, character code switches contained within the unit representing the unique code for the character selected are actuated. A typical layout for a ninety key keyboard is shown in FIG. 6. The key for the letters A and T will be found on the right hand side of the keyboard, while the lower case characters are found on the left-hand side. Information from these character code switches is placed in the 0 through 5 positions of the seven bit code with positions 1 through 5 primarily representing letters, and the 0 position along with positions 1 through 5 representing figures and special characters. When a key signifying an upper case character is depressed, a shift switch is also actuated and information indicating a shift character is placed in the 00 position. For example, when a key representing the upper case character A is depressed, character code switches one and two are actuated as shown by a bit in positions 1 and 2, and the shift switch is closed as shown by a bit in position 00 signifying that an upper case character has been chosen. Likewise, the upper case character T would be represented by a bit in positions 5 and 6. The lower case character i would be represented by a bit in positions 2 and 3 alone.

Figure 3:
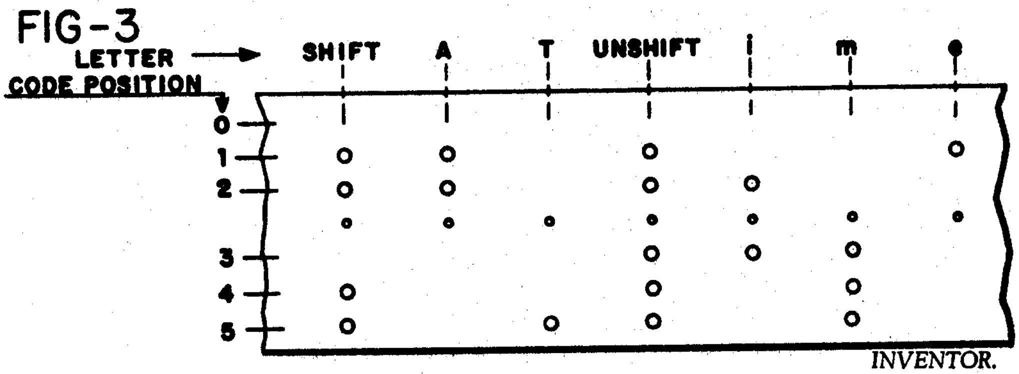
FIG. 3 represents a perforated tape showing the six digit teletypesetting code combinations for the letters A, T, i, m and e.

FIG. 3 shows the same characters as are shown in FIG. 2 as they would be represented by depressing the keys on a Teletypesetter perforator keyboard. This keyboard contains a fewer number of keys than does the typesetting machine keyboard and consequently each key represents more than one character. The same key, for example, is used for both the upper and lower case character A. The keys on the TTS keyboard actuate character code switches in the same manner as described above for the typesetting machine keyboard. There is, however, no shift switch connected to the keys within the TTS keyboard, therefore information on whether the character to be printed is to be in upper case or a lower case character must be supplied by separate function keys. The output of the TTS perforator machine is a control tape or record which is used to automatically control the operation of a typesetting machine. The control tape is usually perforated to indicate the various character and function codes.

As is the case with the typesetting machine keyboard, the letter information is displayed in positions 1 through 5 while figures and special characters used positions 0 through 5. Since there is no seventh bit to represent an upper case or shift character, a special code within the available six bit code must be utilized. Therefore, to signify an upper case or shift character, it is necessary to first depress the SHIFT key on the TTS keyboard before depressing the desired character key. Depressing the SHIFT key will place the shift code on the tape in positions 1, 2, 4 and 5 as shown in FIG. 3. Depressing the character key A will then punch the tape at positions 1 and 2. All keys which are depressed after a shift code has been placed on the tape will then represent upper case or shift characters. For example, if the next character key to be operated represented the letter T then the tape would be punched in position 5 only and an upper case T would thereafter be printed.

In order to indicate thereafter a lower case character on the TTS perforator tape, the UNSHIFT key must be depressed thereby placing an unshift code on the tape in positions 1, 2, 3, 4 and 5. After an unshift code has been placed on the tape, all characters which follow will subsequently be printed as lower case characters. Therefore, by operating the letter keys I, M and E in succession the tape will be punched in positions 2 and 3, to indicate the letter i, in positions 3, 4 and 5 to indicate the m, and in position 1 to represent the letter e.

In order to create a control tape from a typesetting keyboard, it is therefore necessary to provide a converter means for automatically placing a shift or unshift function code on the control tape or record each time a change is made from one mode to the other. The converter apparatus of this invention senses the character key depressed by the operator and will place on the control record a shifting function code, if necessary, immediately prior to recording the character code.

Figure 4:
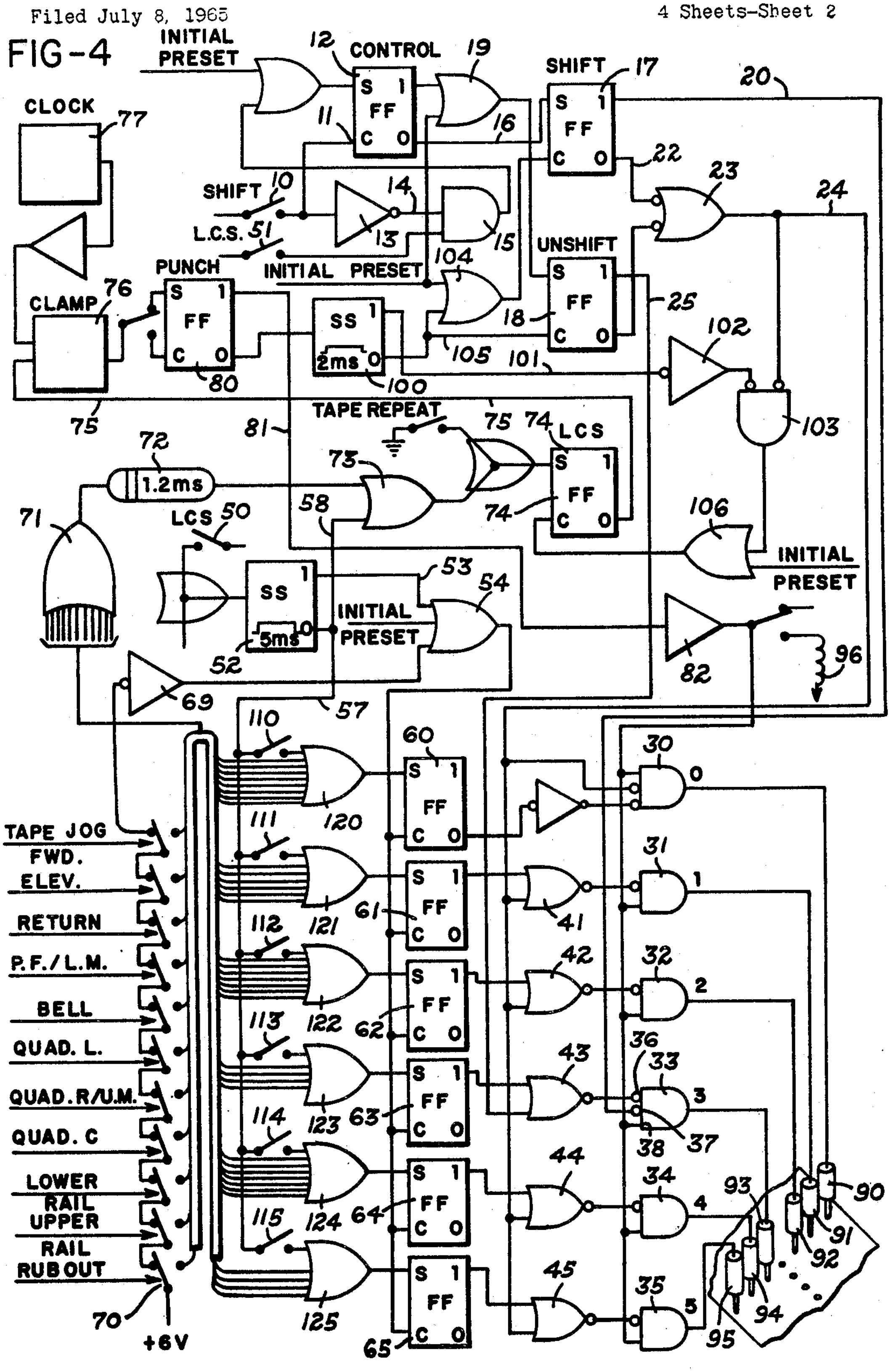
FIG. 4 is a detailed logic electrical diagram of the converter circuit of this invention.
Figure 5:
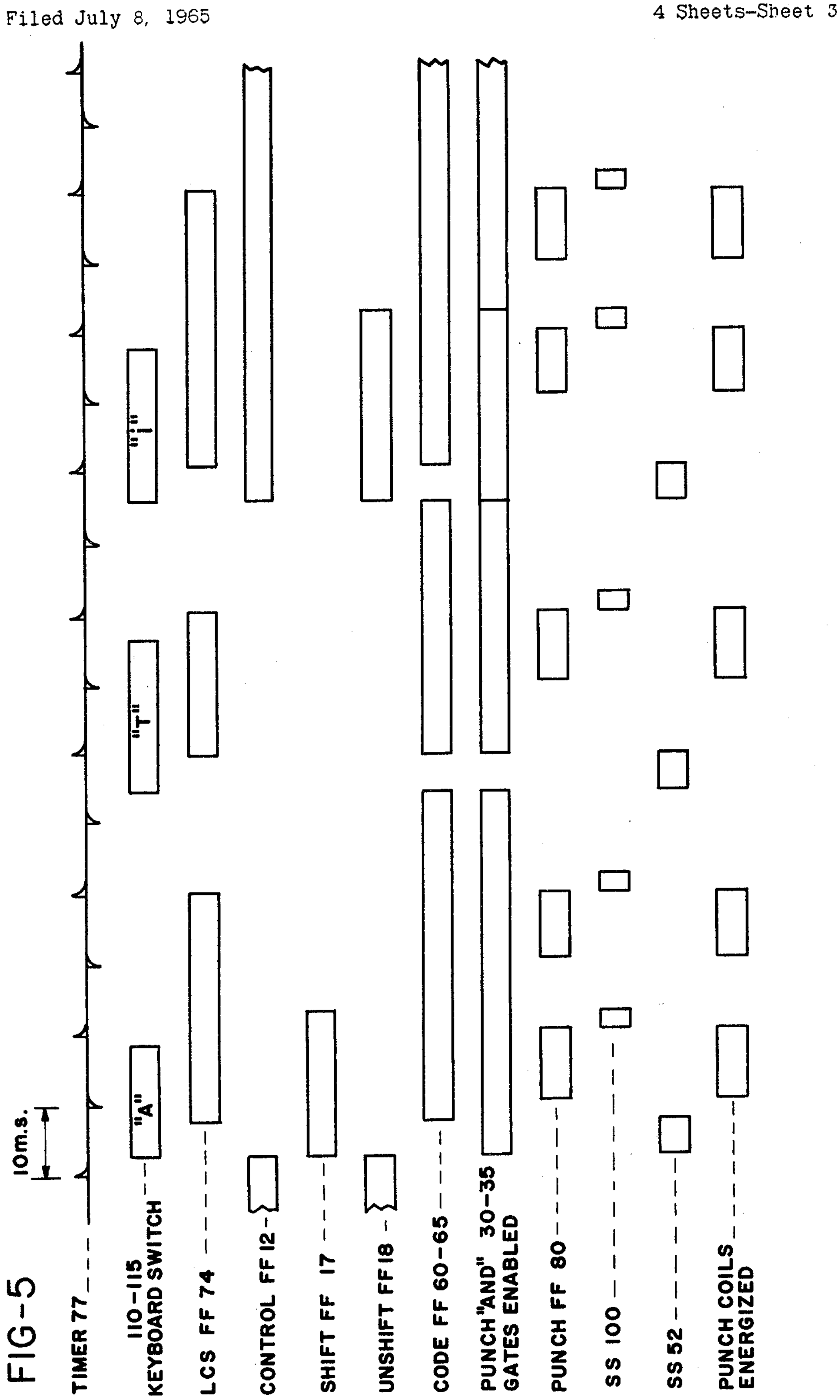
FIG. 5 is a time sequence diagram illustrating the sequence of operation of several of the components shown in FIG. 4.

Reference is now made to FIGS. 4 and 5 for a detailed description of the operation of the converter. When power is initially applied to the converter, an initial preset signal is applied to the various flip-flops to place them in their normal operating condition. The Control Flip-Flop 12 and the Unshift Flip-Flop 18 are placed in the set state while the Shift Flip-Flop 17, the LCS Flip-Flop 74 and all Character Code Flip-Flops 60–65, which form the storage register means for this apparatus, are placed in the clear or reset condition. This is done to assure that a shift code will be placed on the control record if the first key depressed represents a shift character.

The operation of a character key on the typesetting keyboard representing, for example, the capital letter A will actuate three sets of switches, viz, the letter code switches 111 and 112, the shift switch 10, and the last-closing switch 50.

Closing of shift switch 10 will place a One-state signal on reset terminal 11 of Control Flip-Flop 12 and on Amplifier 13. Since Amplifier 13 has a logic negation on its output, a Zero-state signal will be placed on line 14 to inhibit the operation of AND gate 15. The One-state signal on terminal 11 of Control Flip-Flop 12 will reset this Flip-Flop, thus providing a One-state signal on line 16 to set Shift Flip-Flop 17 and create a One-state signal on line 20 to inhibit the operation of AND gate 33.

Since Punch AND gate 33 has three inputs, all three inputs must be in the proper state in order to provide a One-state output signal. A Zero-state signal is required on terminals 36 and 37 while a One-state signal is required on terminal 38 to operate AND gate 33 and provide a One-state signal at its output. Therefore, if a One-state signal is placed on terminal 36 the operation of this AND gate is inhibited and no One-state punching signal at its output can exit.

The Zero-state signal from Shift Flip-Flop 17 on line 22 to the OR gate 23 will provide a One-state signal on line 24 through each of the OR gates 41 through 45. The One-state signal to AND gate 30 will inhibit its operation. The AND gates 31, 32, 34 and 35 will be thus enabled.

The operation of the character key on the typesetting keyboard will actuate the appropriate character code switches. The letter A actuates character code switches 111 and 112.

After all of character code switches have been operated for any one key and the shift switch has been actuated, if necessary, the last closing switch 50 will close and trigger the single-shot 52 to produce a five millisecond One-state pulse on line 53 which will be passed through the OR gate 54 to clear or reset the Character Code storage Flip-Flops 60 through 65. At the end of five milliseconds, a One-state signal will be applied to line 58 to set the LCS Flip-Flop 74, and on line 57 to the character code switches 110 through 115. Since the operator, in depressing the character code key, will keep the key depressed in the order of from thirty to forty milliseconds, the character code switches will still be closed with the One-state signal on line 57 is applied through the character code switches to the Character Code Flip-Flops. Since the capital A has been selected, Character Code Flip-Flops 61 and 62 will be set.

When LCS Flip-Flop 74 sets, a Zero-state signal on line 75 will open the clamp circuit 76 and allow the output from timer or clock 77, which is a part of the perforator standard equipment, to operate the Punch Flip-Flop 80. The output from clock 77 is in the form of alternate positive and negative pulses each of which are spaced ten milliseconds apart.

The first negative going pulse applied to Punch Flip-Flop 80 will set this flip-flop and provide a One-state signal on line 81 through Amplifier 82 to the tape indexing solenoid 96 and to all of the AND gates 30 through 35. As noted before, AND gates 30 and 33 are inhibited while AND gates 31, 32, 34 and 35 are enabled. A One-state output from these enabled AND gates will actuate tape punch coils 91, 92, 94 and 95. The tape is therefore punched with a code which represents the SHIFT function.

The first positive going pulse from clock 77 will clear the Punch Flip-Flop, denergize the punch coils and trigger the Single-Shot 100. The Single-Shot 100 is designed to give a two millisecond One-state pulse on line 101 through Amplifier 102 to the LCS reset AND circuit 103. Since AND circuit 103 is inhibited by the output of OR gate 23, the LCS Flip-Flop will not reset at this time. Upon termination of the two millisecond pulse, line 105 will return to the One-state and a signal through OR gate 104 will clear Shift Flip-Flop 17. Unshift Flip-Flop 18 will also clear due to a One-state signal on line 105. With both Shift Flip-Flop 17 and Unshift Flip-Flop 18 clear, there will no longer be a One-state signal on line 24 to enable the Punch AND circuits 31, 32, 34 and 35, or to inhibit Punch AND circuits 30 and 33.

Since the LCS Flip-Flop remains set, the clamp 76 remains open and the next negative going pulse in clock 77 will again set Punch Flip-Flop 80 to supply a One-state signal to punch AND gates 30 through 35.

Since the letter A on the keyboard was previously depressed, thereby closing switches 111 and 112 and setting Character Code Flip-Flops 61 and 62, a One-state signal from these flip-flops applied through OR gates 41 and 42 will maintain AND gates 31 and 32 enabled. When the Punch Flip-Flop 80 sets the second time, due to the next negative going pulse from clock 77, a One-state signal from the output of AND gates 31 and 32 will energize coils 91 and 92 to punch the tape in positions 1 and 2, thus indicating the letter A. Indexing coil 96 is also energized and will advance the tape to the next position upon the completion of the punching operation and when current is removed from the punch coils.

Punch Flip-Flop 80 will clear on the next positive going pulse from clock 77 and trigger Single-Shot 100. A two millisecond One-state pulse on line 101 will provide a Zero-state output from Amplifier 102 to enable AND circuit 103. Since the Shift Flip-Flop 17 and Unshift Flip-Flop 18 were cleared in the last sequence of operations, the LCS reset AND circuit 103 no longer is inhibited and a One-state output from 103 will pass through OR gate 106 to clear LCS Flip-Flop 74.

If another capital letter is selected, the shift switch 10 will again close and place a One-state signal on terminal 11 to Control Flip-Flop 12. This signal can cause no change in Control Flip-Flop 12 and therefore the Shift Flip-Flop 17 will remain in the clear or reset state. If the character key depressed represented, for example, the letter T, Character Code Switch 115 will close and after the Character Code Flip-Flops 60 through 65 are cleared by the five millisecond pulse from Single-Shot 52, the Character Code Flip-Flop 65 will set and enable punch AND gate 35. At the same time, LCS Flip-Flop 74 will set and allow the timing pulses from clock 77 to operate Punch Flip-Flop 80. The setting of the Punch Flip-Flop will operate AND gate 35 and energize Punch Coil 95 to cause the tape to be punched in position 5 indicating the letter T.

If the next character selected on the typesetting machine represents a lower case letter, it will be necessary, of course, to place a function code on the tape to indicate the unshift operation prior to placing the character code on the tape. Using, for example, the lower case letter i, only character code switches 112 and 113 and last closing switches 50–51 will close. Last closing switch 51 will now enable AND gate 15 which was previously inhibited by the signal from Amplifier 13 during the time the Shift Switch 10 was closed. The output of AND gate 15 will set Control Flip-Flop 12 thereby placing a One-state signal through OR gate 19 to set Unshift Flip-Flop 18. A One-state signal on line 25 will be placed through OR gate 43 to enable the punch AND gate 33. The Zero-state signal of Unshift Flip-Flop 18 to OR 23 will cause a One-state signal to be applied to each of the OR gates 41, 42, 44 and 45 to enable Punch AND gates 31, 32, 34 and 35. An inhibit signal is also placed on AND gate 103. The operation from this point is similar to that previously described except that Punch AND gate 33 is now enabled thereby allowing the Unshift Code to be represented by punching the tape in positions 1, 2, 3, 4 and 5.

Certain keys on the typesetting keyboard do not represent characters to be printed but rather indicate various functions to be performed by the machine, e.g., upper rail, quad left, etc. Each one of the functions can also be recorded on a six digit tape independent of the operation of the character code switches and irrespective of whether a shift or unshift code has been recorded. For this purpose, separate switches are provided to place the desired function code on the control tape. For example, operating the "rub out" switch 70 will first cause a clearing pulse to be placed through Amplifier 69 and OR 54 on each of the Character Code Flip-Flops. After the Character Code Flip-Flops have cleared, a signal through OR gates 120–125 will cause, in the case of a rub-out code, each of the Character Code Flip-Flops to set. A signal will also be placed through OR 71 to set LCS Flip-Flop 74, unclamp timer 77 and cause the tape to be perforated at positions 0, 1, 2, 3, 4 and 5 in the manner previously described.

Thus, the converter apparatus of this invention will automatically record a shift or unshift code on a control record from the operation of a typesetting keyboard, but will not record a shifting code when a key representing a purely machine function is operated.

The system described above uses a set of character code switches which are actuated by each character key on the keyboard, a switch representing a shift character and a last closing switch operable after all of the above switches have been closed. The keyboard switch system could be constructed similar to that described in a copending application of William A. Hadley, Ser. No. 463,200, filed June 11, 1965, now United States Patent 3,297,149, issued Jan. 10, 1967, and assigned to the same assignee as the present invention. However, in one embodiment of this invention, as shown in FIG. 7, only a single switch associated with each key is actually necessary to accomplish all of the various required functions.

Figure 7:
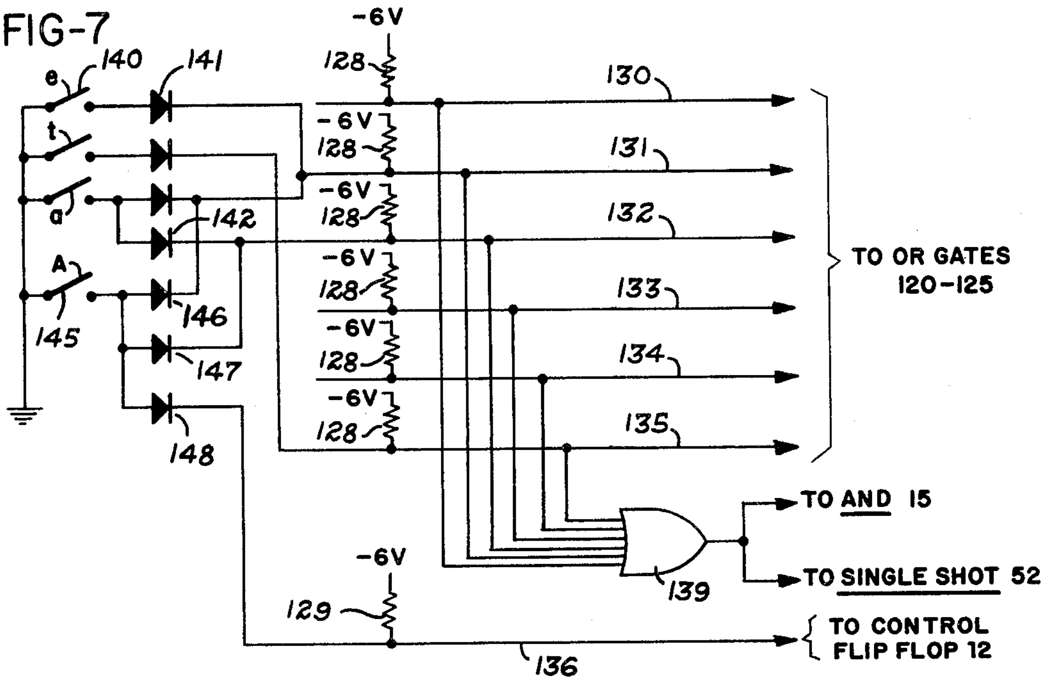
FIG. 7 is a schematic diagram showing a portion of one embodiment of the keyboard matrix circuitry.

To accomplish single switch operation, reference is made to FIG. 7 where a negative six volts is applied through a set of resistors 128 onto lines 130 through 135. Each of lines 130–135 is connected through OR gates 120–125 to the Character Code Flip-Flops. A negative six volts is also applied through resistor 129 to line 136 which is in turn connected to Control Flip-Flop 12 and Amplifier 13. Each of lines 130–135 is also connected to OR gate 139. The output of OR gate 139 is applied to the AND gate 15 and to Single-Shot 52, both of which are shown in FIG. 4.

With but a single switch associated with each key, multiple key effect is accomplished by providing a diode matrix. Any one, or a combination of the output lines 130 through 136 may be activated when any one of the switches associated with the keys on the keyboard is depressed. If, for example, a key representing the letter e is depressed, switch 140 will close and the voltage on line 131 will rise from a negative six volts to zero volts, while all other lines will remain at negative six volts. This operation is possible through the use of diodes, such as diode 141 which is placed in series with switch 140. When switch 140 is closed, current will pass through diode 141 and effectively place line 131 at ground or zero potential. Line 132, however, will remain isolated from line 131 by the action of diode 142.

The transition of voltage from a negative six volts to zero volts will be sensed by the Character Code OR gate 121 and will ultimately set Character Code Flip-Flop 61. A change in voltage in line 131 will also activate OR gate 139 to operate the last closing switch circuitry formerly initiated by closure of switches 50 and 51. Depressing the key representing the letter A will cause switch 145 to close and, through diodes 146 and 147, will place lines 131 and 132 at ground potential. Line 136 will also go to a ground potential through diode 148 and thus clear Control Flip-Flop 12, signifying a shift character.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An apparatus for automatically inserting shift and unshift codes into a control record for use in the automatic operation of a typesetting machine comprising, a keyboard having one set of keys for selecting characters in a shift position and another set of keys for selecting other characters in an unshift position, a single electrical switch operably connected to each key, a record making means capable of recording a code on the control record identifying each selected character without distinguishing in that code between shift and unshift positions, means operable by each of said switches to cause said record making means to form a unique code for each character selected, and further means operably connected to each of said switches in said sets to sense a change from one set of keys to the other set and connected to said record making means to insert a unique code indicating the appropriate change prior to that character code at which the change occurred.

2. In combination with a typesetting keyboard having individual keys for each character available on a typesetting machine, a recorder adapted for automatic operation of a typesetting machine, and a converter for automatically inserting shift and unshift codes between character codes where a shift change operation has occurred, said converter comprising, storage means for storing a character code representing each key selected on said typesetting keyboard regardless of whether said key represented a shift or unshift function, means operable by said keys for sensing a change in the shift or unshift function, and means automatically operable whenever a change in shift function occurs for placing on said control record a unique code indicating the appropriate change in shift function prior to the recording of the character code contained in said storage means.

3. In combination with a typesetting keyboard having individual keys for each character available on a typesetting machine keyboard, a recorder adapted to produce a control tape for automatic operation of a typesetting machine, and a converter for automatically inserting shift and unshift codes between character codes where a shift change operation has occurred, said converter comprising a record making means for placing on said control record a unique code for controlling the operation of said typesetting machine, means operable by each of said keys for sensing a change in shift function of the character selected, means responsive to each of said keys to store a character code representing the key selected, means operable at the completion of each key operation and responsive to said sensing means to cause a shift or unshift code to be placed on the control record if there has been a change in shift function and to place the character code as stored in said character code storage means on the control record only after any required shift or unshift code has been placed thereon.

4. In combination with a typesetting keyboard having individual keys for each character available on a typesetting machine, a recorder adapted to produce a coded control tape for automatic operation of a typesetting machine, and a converter for automatically inserting shift and unshift codes between character codes where a shift function change has occurred, said converter comprising means responsive to the operation of said keys for storing a unique code representing a character designated by said key regardless of shift function, means responsive to the completion of the keyboard operation to clear said storage means of any previous character code stored therein, means operable by each of said keys to sense a change in shift function of the character selected, means responsive to the completion of a keyboard operation to cause a shift function code to be placed on said control record when directed by said sensing means and then to cause the unique code stored in said character code storage means to be placed on said control record.

5. In combination with a typesetting keyboard having individual keys for each character available on a typesetting machine, a perforator adapted to produce a control tape for automatic operation of a typesetting machine, said perforator including a set of punch coils, and a converter for automatically inserting shift and unshift codes between character codes where a shift change operation has occurred, said converter comprising a series of storage means for storing character code information in response to the operation of said keys on said typesetting machine, means responsive to the operation of each of the keys on said keyboard to clear the storage means of any previous character code stored thereon prior to the recordation of said character code information, case sensing means responsive to the operation of each of the keys on said keyboard which produce a character code common to one upper and one lower case character for sensing a change between the keys which correspond to upper and lower case, circuit means placed between the character code storage means and said punch coils, said circuit means also being connected to said case sensing means for enabling said punch coils in accordance with a shifting code if a change in the case occurs between successive characters, gating means controlling said circuit means for inhibiting the operation of selected punch coils during the interval in which the shifting code is applied to said circuit means, and means responsive to the completion of the operation of said keys to cause said punch coils to energize and place a unique code on said control tape in response to the condition of said circuit means and the information recorded on said character code storage means.

6. An apparatus for creating a control record adapted to automatically control the operation of a typesetting machine and which automatically places on said control record a shift or an unshift code immediately prior to recording the code representing the character to which a change in shift occurred, comprising, means for recording a code on said control record, switch means selectively actuated in accordance with a desired character code, storage registers operably connected to said switch means for storing a character code representing a selected character, gate means electrically connected each of said storage registers to said recording means, circuit means responsive to the operation of said switch means and also connected to said gate means to enable selected gate means and to inhibit the operation of selected other gate means when a change in shift function has occurred, and clock means energized at the completion of the operation of said switch means and connected to first actuate said gate means for placing the shift function code on said control record if a change in shift function has occurred and thereafter to energize said gate means and place the character code stored on said storage registers on said control record.

7. The apparatus defined in claim 6, wherein said means for recording a code on a control record comprises a set of punch coils for perforating a paper control tape and wherein each of said punch coils is connected to a corresponding one of said storage registers through said gate means.

8. The apparatus as defined in claim 6, wherein said switch means comprises a single switch associated with each key on a typesetting keyboard and wherein a diode matrix interconnects said swtiches with said storage registers, said circuit means and said clock means.

9. The apparatus as defined in claim 6, wherein said switch means includes a single switch for each storage register, each key on a typesetting keyboard being mechanically interconnected with said switch means to actuate one or a combination of said switches to produce a unique character code, a shift switch actuated by any shift character selected on said keyboard, and a last closing switch actuated at the completion of the operation of the other switches to energize said clock means.

10. The apparatus as defined in claim 9, wherein said circuit means is responsive to the operation of said shift switch to sense a change in the shift function between the charatcer selected and the immediately preceding character.

11. The apparatus as defined in claim 6 wherein a second set of switches is provided for placing on said control record a code which represents a typesetting machine function, said second set of switches being operably connected to one or more of said storage registers and independent of said circuit means so that the operation of any one of said second set of switches will cause only a character code representing a machine function to be placed ultimately on said control record.

References Cited

UNITED STATES PATENTS

| | | | |
|---|---|---|---|
| 2,679,902 | 6/1954 | Brewer | 234—23 |
| 2,739,649 | 3/1956 | Happel et al. | 234—23 |
| 2,760,577 | 8/1956 | Thomas et al. | 234—23 |
| 2,902,092 | 9/1959 | Hildebrandt | 234—23 |
| 3,021,998 | 2/1962 | Brewer | 234—23 |
| 3,106,337 | 10/1963 | Bernard | 234—23 |
| 3,194,493 | 7/1965 | Brewer | 234—23 |

GERALD A. DOST, *Primary Examiner.*